(12) United States Patent
Hallak et al.

(10) Patent No.: US 9,063,910 B1
(45) Date of Patent: Jun. 23, 2015

(54) DATA RECOVERY AFTER TRIPLE DISK FAILURE

(71) Applicant: EMC Corporation, Hopkinton, MA (US)

(72) Inventors: Renen Hallak, Sde Warburg (IL); Tal Ben-Moshe, Kiryat Ono (IL); Yaron Segev, Rannana (IL); Kirill Shoikhet, Raanana (IL); Niko Farhi, Tel-Aviv (IL)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/620,631

(22) Filed: Feb. 12, 2015

Related U.S. Application Data

(63) Continuation of application No. 14/496,262, filed on Sep. 25, 2014, which is a continuation-in-part of application No. 13/296,334, filed on Nov. 15, 2011, now Pat. No. 8,990,495.

(51) Int. Cl.
| | |
|---|---|
| *G06F 12/00* | (2006.01) |
| *G06F 11/20* | (2006.01) |
| *G06F 3/06* | (2006.01) |
| *G06F 11/10* | (2006.01) |

(52) U.S. Cl.
CPC .......... *G06F 11/2094* (2013.01); *G06F 3/0619* (2013.01); *G06F 3/0647* (2013.01); *G06F 3/0689* (2013.01); *G06F 11/1076* (2013.01); *G06F 11/1092* (2013.01); *G06F 2211/1057* (2013.01)

(58) Field of Classification Search
CPC ............ G06F 11/1092; G06F 11/1076; G06F 2211/1057
See application file for complete search history.

(56) References Cited

U.S. PATENT DOCUMENTS

| | | | |
|---|---|---|---|
| 5,301,297 | A | 4/1994 | Menon et al. |
| 5,453,998 | A | 9/1995 | Dang |
| 5,603,001 | A | 2/1997 | Sukegawa et al. |
| 6,158,017 | A | 12/2000 | Han et al. |
| 6,871,317 | B1 | 3/2005 | Corbett |
| 6,993,701 | B2 | 1/2006 | Corbett et al. |
| 7,073,115 | B2 | 7/2006 | English et al. |
| 8,799,705 | B2 | 8/2014 | Hallak et al. |
| 2007/0089045 | A1 | 4/2007 | Corbett et al. |
| 2012/0124282 | A1 | 5/2012 | Frank et al. |
| 2013/0124776 | A1 | 5/2013 | Hallak et al. |

OTHER PUBLICATIONS

Hallak et al., "Data Recovery After Triple Disk Failure;" filed Sep. 25, 2014 corresponding to U.S. Appl. No. 14/496,262; 40 Pages.

(Continued)

*Primary Examiner* — Larry Mackall
(74) *Attorney, Agent, or Firm* — Daly, Crowley, Mofford & Durkee, LLP

(57) ABSTRACT

In one aspect, a redundant array of independent disk (RAID) memory storage system includes a plurality of data storage disks comprising data blocks, a first redundancy storage disk comprising parity blocks that are a parity by row of the data blocks in the data storage disks, a second redundancy storage disk comprising parity blocks storing parities of diagonals of the data blocks in the data storage disks, a third redundancy storage disk comprising parity blocks storing parities of diagonals of the data blocks in the data storage disks and circuitry configured to recover data from three failed storage disks.

20 Claims, 21 Drawing Sheets

(56) References Cited

OTHER PUBLICATIONS

Office Action dated Dec. 4, 2014 corresponding to U.S. Appl. No. 14/496,262; 16 Pages.
Response to Office Action dated Dec. 4, 2014 corresponding to U.S. Appl. No. 14/496,262; Response Filed Dec. 10, 2014; 12 Pages.
Notice of Allowance dated Jan. 9, 2015 corresponding to U.S. Appl. No. 14/496,262; 8 Pages.
37 C.F.R. § 1.312 Amendment filed on Feb. 4, 2015 corresponding to U.S. Appl. No. 14/496,262; 9 Pages.
Office Action dated Jun. 19, 2014 corresponding with U.S. Appl. No. 13/296,334; 10 Pages.
Response to Office Action dated Jun. 19, 2014 corresponding with U.S. Appl. No. 13/296,334; Response Filed on Oct. 20, 2014; 13 Pages.
Notice of Allowance dated Nov. 13, 2014 corresponding to U.S. Appl. No. 13/296,334; 5 Pages.
U.S. Appl. No. 14/496,262, 262 Pages.

| D0 | D1 | D2 | D3 | D4 | P | Q |
|---|---|---|---|---|---|---|
| Data | Data | Data | Data | Data | Redundancy | Redundancy |
| Data | Data | Data | Data | Data | Redundancy | Redundancy |
| Data | Data | Data | Data | Data | Redundancy | Redundancy |
| Data | Data | Data | Data | Data | Redundancy | Redundancy | k = 5

*FIG. 1*

Prior Art

| Data Disk 1 | Data Disk 2 | Data Disk 3 | Data Disk 4 | Data Disk 5 | Row Parity Disk | Diagonal Parity Disk |
|---|---|---|---|---|---|---|
| <1, 5> | <1, 6> | <1, 7> | <1, 8> | <1, 9> | ⊕1 | ⊕5⊕9 |
| <2, 6> | <2, 7> | <2, 8> | <2, 9> | <2, 5> | ⊕2 | ⊕6⊕9 |
| <3, 7> | <3, 8> | <3, 9> | <3, 5> | <3, 6> | ⊕3 | ⊕7⊕9 |
| <4, 8> | <4, 9> | <4, 5> | <4, 6> | <4, 7> | ⊕4 | ⊕8⊕9 |

*FIG. 2*

Prior Art

| Data Disk 1 | Data Disk 2 | Data Disk 3 | Data Disk 4 | Row Parity Disk | Diagonal Parity Disk |
|---|---|---|---|---|---|
| <1, 5> | <1, 6> | <1, 7> | <1, 8> | <⊕1, -> | ⊕5 |
| <2, 6> | <2, 7> | <2, 8> | <2, -> | <⊕2, 5> | ⊕6 |
| <3, 7> | <3, 8> | <3, -> | <3, 5> | <⊕3, 6> | ⊕7 |
| <4, 8> | <4, -> | <4, 5> | <4, 6> | <⊕4, 7> | ⊕8 |

*FIG. 3*
Prior Art

| D0 | D1 | D2 | D3 | D4 | P | Q |
|---|---|---|---|---|---|---|
| Data | Data | Data | Data | Data | Row Parity | Diagonal Parity |
| Data | Data | Data | Data | Data | Row Parity | Diagonal Parity |
| Data | Data | Data | Data | Data | Row Parity | Diagonal Parity |
| Data | Data | Data | Data | Data | Row Parity | Diagonal Parity |
| | | | | | | Diagonal Parity | k-1 rows (left brace); k = 5 (prime)

*FIG. 5*

| Data Disk 1 | Data Disk 2 | Data Disk 3 | Data Disk 4 | Data Disk 5 | Row Parity Disk | Diagonal Parity Disk |
|---|---|---|---|---|---|---|
| <1, 5> | <1, 6> | <1, 7> | <1, 8> | <1, 9> | ⊕1 | ⊕5 |
| <2, 6> | <2, 7> | <2, 8> | <2, 9> | <2, 5> | ⊕2 | ⊕6 |
| <3, 7> | <3, 8> | <3, 9> | <3, 5> | <3, 6> | ⊕3 | ⊕7 |
| <4, 8> | <4, 9> | <4, 5> | <4, 6> | <4, 7> | ⊕4 | ⊕8 |
| | | | | | | ⊕9 |

*FIG. 6*

|     |   |   |   |   |   |   |   |
|-----|---|---|---|---|---|---|---|
| S1: | D | D | D | D | D | P | Q' |
| S2: | D | D | D | D | P | Q'| D |
| S3: | D | D | D | P | Q'| D | D |
| S4: | D | D | P | Q'| D | D | D |
| S5: | D | P | Q'| D | D | D | D |
| S6: | P | Q'| D | D | D | D | D |
| S7: | Q'| D | D | D | D | D | P |

|     | | | | | | | |
| --- | --- | --- | --- | --- | --- | --- | --- |
| S1: | D | D | D | D | D | P | Q |
| S2: | D | D | D | D | P | Q | D |
| S3: | D | D | D | P | Q | D | D |
| S4: | D | D | P | Q | D | D | D |
| S5: | D | P | Q | D | D | D | D |
| S6: | P | Q | D | D | D | D | D |
| S7: | Q | D | D | D | D | D | P |

FIG. 10

| D0 | D1 | D2 | D3 | D4 | P | Q |
| --- | --- | --- | --- | --- | --- | --- |
| Data | Data | Data | Data | Blank | Row Parity | Diagonal Parity |
| Data | Data | Data | Blank | Data | Row Parity | Diagonal Parity |
| Data | Data | Blank | Data | Data | Row Parity | Diagonal Parity |
| Data | Blank | Data | Data | Data | Row Parity | Diagonal Parity | k-1 rows; k = 5 (prime)

FIG. 11

| Data Disk 1 | Data Disk 2 | Data Disk 3 | Data Disk 4 | Data Disk 5 | Row Parity Disk | Diagonal Parity Disk |
|---|---|---|---|---|---|---|
| <1, 5> | <1, 6> | <1, 7> | <1, 8> | --- | ⊕1 | ⊕5 |
| <2, 6> | <2, 7> | <2, 8> | --- | <2, 5> | ⊕2 | ⊕6 |
| <3, 7> | <3, 8> | --- | <3, 5> | <3, 6> | ⊕3 | ⊕7 |
| <4, 8> | --- | <4, 5> | <4, 6> | <4, 7> | ⊕4 | ⊕8 |

*FIG. 12*

|     |     |     |     |     |     |     |     |
| --- | --- | --- | --- | --- | --- | --- | --- |
| S1: | D1' | D   | D   | D   | D   | P'  | Q'  |
| S2: | D   | D   | D   | D   | P'  | Q'  | D1' |
| S3: | D   | D   | D   | P'  | Q'  | D1' | D   |
| S4: | D   | D   | P'  | Q'  | D1' | D   | D   |
| S5: | D   | P'  | Q'  | D1' | D   | D   | D   |
| S6: | P'  | Q'  | D1' | D   | D   | D   | D   |
| S7: | Q'  | D1' | D   | D   | D   | D   | P'  |

|     |    |   |   |   |   |    |    |
|-----|----|---|---|---|---|----|----|
| S1: | D1 | D | D | D | D | P  | Q  |
| S2: | D  | D | D | D | P | Q  | D1 |
| S3: | D  | D | D | P | Q | D1 | D  |
| S4: | D  | D | P | Q | D1| D  | D  |
| S5: | D  | P | Q | D1| D | D  | D  |
| S6: | P  | Q | D1| D | D | D  | D  |
| S7: | Q  | D1| D | D | D | D  | P  |

*FIG. 14*

|     | | | | | | | |
| --- | --- | --- | --- | --- | --- | --- | --- |
| S1: | D1 | D | D | D | D | P | Q |
| S2: | D | D | D | D | P | Q | D1 |
| S3: | D | D | D | P | Q | D1 | D |
| S4: | D | D | P | Q | D1 | D | D |
| S5: | D | P | Q | D1 | D | D | D |
| S6: | P | Q | D1 | D | D | D | D |
| S7: | Q | D1 | D | D | D | D | P |

*FIG. 15*

| D0 | D1 | D2 | D3 | D4 | P | Q |
| --- | --- | --- | --- | --- | --- | --- |
| <1, 5> | <1, 6> | <1, 7> | <1, 8> | <1, 9> | ⊕ 1 | ⊕ 5 |
| <2, 6> | <2, 7> | <2, 8> | <2, 9> | <2, 5> | ⊕ 2 | ⊕ 6 |
| <3, 7> | <3, 8> | <3, 9> | <3, 5> | <3, 6> | ⊕ 3 | ⊕ 7 |
| <4, 8> | <4, 9> | <4, 5> | <4, 6> | <4, 7> | ⊕ 4 | ⊕ 8 |
| | | | | | | ⊕ 9 |

*FIG. 16*

| D0 | D1 | D2 | D3 | D4 | P0 | P1 | Q |
|---|---|---|---|---|---|---|---|
| Data | Data | Data | Data | Data | Row Parity | Row Parity | Diagonal Parity |
| Data | Data | Data | Data | Data | Row Parity | Row Parity | Diagonal Parity |
| Data | Data | Data | Data | Data | Row Parity | Row Parity | Diagonal Parity |
| Data | Data | Data | Data | Data | Row Parity | Row Parity | Diagonal Parity |
| | | | | | | | Diagonal Parity | k = 5 (prime), k-1 rows of data

*FIG. 19*

| Data Disk 1 | Data Disk 2 | Data Disk 3 | Data Disk 4 | Data Disk 5 | Row Parity Disk 0 | Row Parity Disk 1 | Diagonal Parity Disk |
|---|---|---|---|---|---|---|---|
| <1.0, 5> | <1.0, 6> | <1.1, 7> | <1.1, 8> | <1.1, 9> | ⊕ 1.0 | ⊕ 1.1 | ⊕ 5 |
| <2.0, 6> | <2.0, 7> | <2.1, 8> | <2.1, 9> | <2.1, 5> | ⊕ 2.0 | ⊕ 2.1 | ⊕ 6 |
| <3.0, 7> | <3.0, 8> | <3.1, 9> | <3.1, 5> | <3.1, 6> | ⊕ 3.0 | ⊕ 3.1 | ⊕ 7 |
| <4.0, 8> | <4.0, 9> | <4.1, 5> | <4.1, 6> | <4.1, 7> | ⊕ 4.0 | ⊕ 4.1 | ⊕ 8 |
| | | | | | | | ⊕ 9 |

*FIG. 20*

| D0 | D1 | D2 | D3 | D4 | P | Q | R |
|---|---|---|---|---|---|---|---|
| Data | Data | Data | Data | Data | Row Parity | Diagonal Parity | Diagonal Parity |
| Data | Data | Data | Data | Data | Row Parity | Diagonal Parity | Diagonal Parity |
| Data | Data | Data | Data | Data | Row Parity | Diagonal Parity | Diagonal Parity |
| Data | Data | Data | Data | Data | Row Parity | Diagonal Parity | Diagonal Parity |
| | | | | | | Diagonal Parity | | k = 5 (prime)

DATA RECOVERY AFTER TRIPLE DISK FAILURE

RELATED APPLICATIONS

This patent application is a continuation of U.S. patent application Ser. No. 14/496,262, filed Sep. 25, 2014, and entitled "DATA RECOVERY AFTER TRIPLE DISK FAILURE," which claims benefit of and is a continuation-in-part of U.S. patent application Ser. No. 13/296,334, filed Nov. 15, 2011, and entitled "SECURE DATA STORAGE IN RAID MEMORY DEVICES." All applications in this paragraph are incorporated herein by reference in their entirety.

BACKGROUND

RAID is an acronym for Redundant Array of Independent Disks, and is a system for storing data on multiple disks in which redundancy of data storage between the disks ensures recovery of the data in the event of failure. This is achieved by combining multiple disk drive components into a logical unit, where data is distributed across the drives in one of several ways called RAID levels.

RAID is now used as an umbrella term for computer data storage schemes that can divide and replicate data among multiple physical disk drives. The terms disks and drives will be used interchangeably henceforth. The physical disks are said to be in a RAID array, which is accessed by the operating system as one single disk. The different schemes or architectures are named by the word RAID followed by a number (e.g., RAID-0, RAID-1). Each scheme provides a different balance between two key goals: increasing data reliability and increasing input/output performance.

The most basic form of RAID—a building block for the other levels but not used for data protection, is RAID-0, which has high performance but no redundancy. The data is spread evenly between N disks. RAID-0 gives maximum performance since data retrieval is carried out on all N disks in parallel. However each data item is stored exactly once so disk failure always loses some data.

RAID-1 requires mirroring of all the data. Capacity drops by 50% since all data is stored twice, but excellent performance is still achieved since the data is still spread between disks in the same way, allowing for parallel reads. RAID-1 can support failure of one of each pair of disks; however, the price is the loss of half of the capacity. Although multiple disk failures can be tolerated, only one failure is possible per mirrored pair without loss of data.

In greater detail, RAID-1 is mirroring. Mirroring comprises writing each block of data to two disks, $D_0$ and $D_1$, and reconstructing a disk by copying its mirror disk upon failure. This method requires performing two disk writes per user write, and consumes an overhead of 100% in capacity. Its rebuild requires performing reads and writes in proportion to the size of the failed disk, without additional computation penalties. Additionally, reading data which resided on the failed disk while in degraded mode requires a single disk read, just as under a normal system operation.

In general, RAID-1 protects from single disk failure. It may protect from more than one failure if no two failed disks are part of the same pair, known as a "RAID group". RAID-1 may also be implemented in "n-way mirroring" mode to protect against any n−1 disk failures. An example is RAID 1.3 which introduced three-way mirroring, so that any two disks could fail and all the data could still be recovered. The cost however is that there is only 33% utilization of the disks.

A requirement thus became apparent, to somehow develop a system that allowed for the system to recover all data after the failure of any disk at the cost of a more reasonable overhead, and as a result RAID-4 was developed.

RAID-4 uses a parity bit to allow data recovery following failure of a bit. In RAID-4 data is written over a series of N disks and then a parity bit is set on the N+1 disk. Thus if N is 9, then data is written to 9 disks, and on the tenth, a parity of the nine bits is written. If one disk fails the parity allows for recovery of the lost bit. The failure problem is solved without any major loss of capacity. The utilization rate is 90%. However the tenth disk has to be changed with every change of every single bit on any of the nine disks, thus causing a system bottleneck.

In greater detail, a RAID-4 group contains k data disks and a single parity disk. Each block i in the parity disk P contains the XOR of the blocks at location i in each of the data disks. Reconstructing a failed disk is done by computing the parity of the remaining k disks. The capacity overhead is 1/k. This method contains two types of user writes—full stripe writes known as "encode" and partial stripe modifications known as "update". When encoding a full stripe, an additional disk write must be performed for every k user writes, and k−1 XORs must be performed to calculate the parity. When modifying a single block in the stripe, two disk reads and two disk writes must be performed, as well as two XORs to compute the new parity value. The rebuild of a failed block requires reading k blocks, performing k−1 XORs, and writing the computed value. Reading data which resided on the failed disk while in degraded mode also requires k disk reads and k−1 XOR computations. RAID-4, like RAID-1, protects from a single disk failure.

RAID-5 solves the bottleneck problem of RAID-4 in that parity stripes are spread over all the disks. Thus, although some parity bit somewhere has to be changed with every single change in the data, the changes are spread over all the disks and no bottleneck develops.

However RAID-5 still only allows for a single disk failure.

In order to combine the multiple disk failure of RAID 1.3 with the high utilization rates of RAID-4 and 5, and in addition to avoid system bottlenecks, Raid 6 was specified to use an N+2 parity scheme that allows failure of two disks. RAID-6 defines block-level striping with double distributed parity and provides fault tolerance of two drive failures, so that the array continues to operate with up to two failed drives, irrespective of which two drives fail. Larger RAID disk groups become more practical, especially for high-availability systems. This becomes increasingly important as large-capacity drives lengthen the time needed to recover from the failure of a single drive. Following loss of a drive, single-parity RAID levels are as vulnerable to data loss as a RAID-0 array until the failed drive is replaced and its data rebuilt, but of course the larger the drive, the longer the rebuild takes, causing a large vulnerability interval. The double parity provided by RAID-6 gives time to rebuild the array without the data being at risk if a single additional drive fails before the rebuild is complete.

Reference is now made to FIG. 1, which illustrates a general scheme for RAID-6. RAID-6 is similar to RAID-4 and RAID-5, and can be seen as an extension of these schemes. The main difference is that RAID-6 schemes can tolerate up to two disk failures. The implementation of RAID-6 is not well defined, and several coding schemes are known. RAID-6 is herein defined as any N+2 coding scheme which tolerates double disk failure, while user data is kept in the clear. This additional requirement assures that user reads are not affected by the RAID scheme under normal system operation. The different possible coding schemes vary in performance with respect to various parameters.

There are main parameters used to measure such a RAID scheme. The first parameter is capacity overhead. The optimal scheme includes two redundancy disks (which may or may not be parity based) for every k data disks, thus reaching a capacity overhead of 2/k. It should be noted, that based on statistical considerations of double disk failure, under a RAID-6 scheme k can easily be set to be twice as large as under RAID-5, thus keeping the same capacity overhead ratio.

When updating a certain block in a stripe, we are interested in the number of IOs required and the number of calculations that must be performed. The optimal is three reads, three writes and three XORs.

RAID-6 rebuild includes two different processes—rebuilding after one disk failure, and rebuilding after two disk failures. After a single disk failure, the optimal number of reads needed is k/2, as opposed to k reads in RAID-4. Such optimal performance requires codes which permit reading partial columns, by taking advantage of both redundancy blocks of the stripe, as described in greater detail herein. The minimal number of XORs required is k−1. After the second disk failure, rebuilding a failed block, on average, requires reading k/2 blocks, performing k−1 XORs, and writing the computed value. It should be noted that this does not imply that rebuilding a specific block can be done efficiently, since the rebuilding of one block may depend upon the rebuilding of a different block.

In order to prevent bottlenecks, RAID-6 may also be implemented in the manner of RAID-5, where redundancy information is spread on the various disks in a well-balanced manner.

The specification for RAID-6 does not specify how the data recovery is to be achieved and each storage manufacturer embodies RAID-6 in a different way.

Several RAID-6 schemes have been proposed and used in practice. One solution is to use the Reed Solomon error correction code, which is expensive to calculate.

Another possibility is with parity bits. N Data disks are supported by two redundancy disks p1 and p2, each one holding a different parity bit. Again, if all the parity bits are on the same two disks then the bottleneck becomes a problem. However the problem can be solved by use of distributed parity stripes over N+2 disks as was specified in RAID-5.

The following describes two such coding schemes which are based on parity calculations of rows and diagonals in a matrix of blocks. These two codes are known as Even/Odd and RDP. They both add a second parity disk, labeled Q, which contains blocks that hold the parity of diagonals of the data blocks. P, as before, contains blocks that hold the parities of rows of blocks. Note that in both schemes, it is advantageous to work with a block size which is smaller than the native page size, for the examples in this section we assume the native page size is 4 KB, and that the block size is 1 KB. Each stripe contains four rows, and thus the four blocks present on each disk form a single native page. It is assumed that pages are read and written using a single disk operation.

Reference is now made to FIG. 2, which illustrates a version of RAID-6 called "even odd", which again uses two parity disks P and Q. A P disk is set up exactly as in RAID-4 and 5, to give a row parity, and Q is the parity of the diagonals. The system requires a prime number of diagonals k, and one less number of rows (k−1). The geometry of the situation gives one more diagonal than there are rows and so the Even Odd scheme adds the extra diagonal's parity to each of the other diagonal parity blocks. The resulting scheme works but the update overhead is sub-optimal.

Under Even/Odd, each stripe contains k (k must be prime) data disks, and two parity disks P and Q. The stripe is composed of a matrix of blocks, which contains k−1 rows. Each of the k+2 disks is viewed as a column in the matrix. Disk P contains k−1 blocks, each consisting of the parity of the k data disk blocks in its row. The k by k−1 matrix made up by the blocks in the data disks contains k diagonals, each of size k−1. The k−1 first diagonals are considered "regular" diagonals, and the last diagonal is known as the "extra" diagonal. Each of the k−1 blocks in disk Q, holds the parity of one of the regular diagonals XORed with the parity of the extra diagonal.

It is not coincidental that there exist more diagonals than rows. It is this asymmetry that allows the recovery of two disk (column) failures. The asymmetry provides that for any two disks that fail, each of their respective columns contains at least one block which belongs to a diagonal not present in the second column. This allows the beginning of the recovery process, by reconstructing this block according to its diagonal information alone. The recovery process continues by reconstructing the block in the same row as the recovered block, using their row information. Performing these two steps iteratively yields a complete recovery. Of course, this entire process can begin only after the parity blocks of the diagonals are decoded. To achieve this, the parity of the extra diagonal is decoded by XORing all blocks in the stripe, and then XORing this value with the rest of the diagonals' parity blocks.

Let us now analyze the efficiency of Even/Odd. It is optimal in terms of capacity overhead, and also in terms of the I/O overhead imposed upon update operations. In terms of computation, however, it is not optimal. The average number of XORs needed when performing an update operation, is almost 4. The reason for this is that updating the blocks of the "extra" diagonal requires many more XORs than updating the blocks of the "regular" diagonals. An updated block in a regular diagonal requires (the optimal) 3 XORs. An updated block in the extra diagonal requires k+1 XORs. Since there are k−1 blocks in the extra diagonal, and $(k-1)^2$ blocks in regular diagonals, the average number of XORs is $3(k-1)^2 + (k-1)(k+1)$ divided by $k(k-1)$ total blocks. This equals $(4k-2)/k$ which approaches 4 as k grows. That is to say, a particularly high update overhead is encountered when updating the $k^{th}$ diagonal (the one that has no corresponding row) since it is spread over all the other diagonal parities. The overhead can be reduced by using data blocks of 1K, and then updating a whole column in one go. In this case just three reads and three writes are required. However four XOR operations are still required per update.

Rebuild efficiency for first disk failure requires k reads and the optimal k−1 XORs. This operation is performed using row parity only, just as in RAID-4. Rebuild efficiency for two disk failure requires more XORs than optimal, due to extra XORs performed to decode the extra diagonal's parity information.

Reference is now made to FIG. 3, which is a simplified schematic diagram illustrating an alternative scheme to Even Odd known as RDP or Row Diagonal Parity. RDP is the same as Even Odd except that it deals with the extra parity data (the additional diagonal in the Even Odd scheme) in a different way. RDP arranges the data in a prime minus one number of rows and data columns K (where K+1 is prime). The row parity data P is then included in calculation of the diagonal parities. The data matrix is then one place short for the K diagonals, so that the $K^{th}$ diagonal is not written. However, since the row parities are themselves included in calculating the remaining diagonal parities, the necessary information is present and full two-disk failure data recovery is possible.

In greater detail, RDP is very similar to Even/Odd. The main difference is in the handling of the extra diagonal. Instead of adding its parity to all of the blocks in Q, RDP simply does not keep parity information for the extra diagonal. This of course is not enough, since now the blocks in the extra diagonal are "represented" only in one parity block. To remedy this, RDP adds the blocks of the first parity column (P) to the diagonals. In this way, if a block in the extra diagonal is updated, it induces a change in two parity blocks. The first is its row parity block in P, and the second is its row parity block's diagonal parity block in Q.

Under RDP, each stripe contains k (k+1 must be prime) data disks, and two parity disks P and Q. The stripe is composed of a matrix of blocks, which contains k rows. Each of the k+2 disks is viewed as a column in the matrix. Disk P contains k blocks, each consisting of the parity of the k data disk blocks in its row. The k by k+1 matrix made up by the blocks in the data disks and P contains k regular diagonals and one extra diagonal, each of size k. Each of the k blocks in disk Q, holds the parity of one of the regular diagonals.

The efficiency of RDP is similar to Even/Odd. Again, the average number of XORs needed when performing an update operation is almost 4 (in contrast to an optimal of 3), and the number of reads needed when reconstructing a block after a single disk failure is k (where the optimal is k/2). The reason for the extra XORs is that when updating a block, its row parity block in P must be updated as well as two diagonal parity blocks in Q—the block of its own diagonal and the block of its parity block's diagonal. In general, $(k-1)^2$ blocks require 4 XORs, and the remaining 2k-1 blocks require 3 XORs. Thus the average over all $k^2$ blocks is 3 plus $(k-1)^2/k^2$ which approaches 4 as k grows.

The extra XORs mandate that each column is mapped to a page instead of each block being mapped to a page. If each block was mapped to a page these extra XORs would cause additional read and write operations for each update, which is not acceptable. Thus, only optimal codes (in terms of update efficiency) have the ability to map blocks to pages without incurring an IO overhead.

The importance of mapping blocks to pages relates to efficient rebuild. In theory, RDP has a rebuild technique for first disk failure, which requires reading only approximately three quarters of the blocks. This can be done by checking half of the rows using the P parity, and then recovering the remaining rows using the diagonals. However, it offers little benefit in practice because these blocks reside in all of the columns, and each column is mapped to a page. Thus, in practice, no read is spared and k reads must be performed.

It is noted that while k, which dictates the number of columns in both codes, must be a prime number (or a prime number minus one), this does not diminish the flexibility of choosing any number of disks for the stripe size. This can be accomplished by using virtual disks for the remaining columns, whose content is permanently set to zero and thus does not affect any XOR calculations. In fact, the content may be permanently set to any predefined data which does not affect the XOR calculations. k must only be larger than the maximum number of disks in a stripe. There is a slight penalty for fixing a large k with these codes, because their update efficiency decreases as k grows.

SUMMARY

In one aspect, a redundant array of independent disk (RAID) memory storage system includes a plurality of data storage disks that include data blocks, a first redundancy storage disk that includes parity blocks that are a parity by row of the data blocks in the data storage disks, a second redundancy storage disk that includes parity blocks storing parities of diagonals of the data blocks in the data storage disks, a third redundancy storage disk that includes parity blocks storing parities of diagonals of the data blocks in the data storage disks and circuitry configured to recover data from three failed storage disks.

In another aspect, a method includes determining that three storage disks have failed in a redundant array of independent disk (RAID) memory storage system that includes a plurality of data storage disks that includes data blocks and a plurality of redundancy storage disks. The plurality of redundancy storage disks include a first redundancy storage disk that includes parity blocks that are a parity by row of the data blocks in the data storage disks, a second redundancy storage disk that includes parity blocks storing parities of diagonals of the data blocks in the data storage disks and a third redundancy storage disk that includes parity blocks storing parities of diagonals of the data blocks in the data storage disks. The method further includes recovering the three storage disks that failed.

In a further aspect, an article includes a non-transitory computer-readable medium that stores computer-executable instructions. The instructions cause a machine to determine that three storage disks have failed in a redundant array of independent disk (RAID) memory storage system. The RAID memory storage system includes a plurality of data storage disks that includes data blocks and a plurality of redundancy storage disks. The plurality of redundancy storage disks include a first redundancy storage disk that includes parity blocks that are a parity by row of the data blocks in the data storage disks, a second redundancy storage disk that includes parity blocks storing parities of diagonals of the data blocks in the data storage disks and a third redundancy storage disk that includes parity blocks storing parities of diagonals of the data blocks in the data storage disks. The instructions also cause a machine to recover the three storage disks that failed.

BRIEF DESCRIPTION OF THE DRAWINGS

FIG. 1 is a simplified block diagram schematically illustrating the known specification for RAID-6.

FIG. 2 is a schematic diagram illustrating the known Even Odd implementation of RAID-6.

FIG. 3 is a simplified diagram illustrating the known RDP implementation of RAID-6.

FIG. 5 is a block diagram showing a distribution of data blocks in the RAID-6 memory array of FIG. 4.

FIG. 6 is a schematic block diagram showing in greater detail the distribution of data blocks of FIG. 5.

FIG. 10 is a simplified schematic diagram illustrating an alternative way in which the p and q parity blocks can be distributed in balanced manner between actual physical disks.

FIG. 11 is a simplified schematic block diagram illustrating an embodiment in which a diagonal over the data is kept blank.

FIG. 12 is a simplified block diagram illustrating the embodiment of FIG. 11 in which the data blocks of FIG. 11 are shown in greater detail.

FIG. 13 is a simplified schematic diagram illustrating one way in which the blocks can be distributed in balanced manner between actual physical disks.

FIG. 14 is a simplified schematic diagram illustrating an alternative way in which the blocks can be distributed in balanced manner between actual physical disks.

FIG. 15 is a simplified schematic diagram illustrating another alternative way in which the blocks can be distributed in balanced manner between actual physical disks.

FIG. 16 is a simplified schematic diagram illustrating recovery of data after a single disk failure by using row parity for the first half of the data and diagonal parity for the second half of the data, thus saving on the number of data blocks that need to be read to recover the data.

FIG. 19 is a simplified schematic block diagram illustrating an embodiment in which several row parity columns are present.

FIG. 20 is a simplified block diagram illustrating the embodiment of FIG. 19 in which the data blocks of FIG. 19 are shown in greater detail.

FIG. 22 is a block diagram showing an example distribution of data blocks in the RAID memory array of FIG. 21.

DETAILED DESCRIPTION

Figure 4:
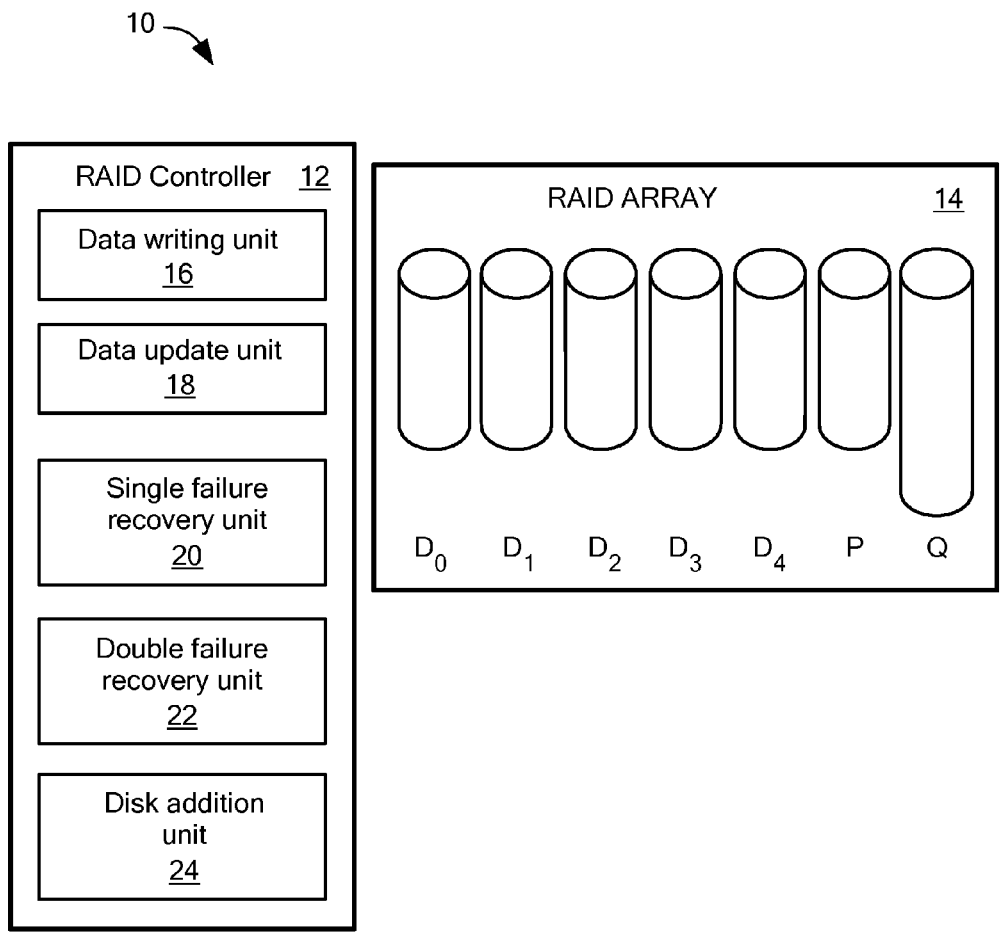
FIG. 4 is a simplified schematic diagram illustrating a RAID-6 memory system.

Reference is now made to FIG. 4, which illustrates a redundant array of independent disk (RAID) memory storage system 10. The memory storage system 10 comprises a controller 12 and an array 14 of data storage disks, in this example five data disks $D_0 \ldots D_4$.

The controller 12 includes a data write unit 16 for writing initial data into the array, an update unit 18 for updating existing data in the array, a single failure recovery unit 20 for recovering data after a single disk failure and a double failure recovery unit 22 for recovering data following concurrent failure of two disks. A disk addition unit 24 manages the addition of a new disk to the system, either after failure of an existing disk or when it is desired to expand the system 10. The operation of each of these units is discussed in greater detail herein.

Each of the disks in the array 14 stores a column of data blocks. The same data block in successive disks forms a row, which is to say the rows cross the disks. The data storage blocks are stored alongside parity data blocks in parity disks p and q, and the numbers of data blocks in the different columns or disks are different.

Row parity data is placed in row parity blocks in row parity column P (redundancy disk P). Diagonal parity data is placed in diagonal parity blocks in a diagonal parity column Q (redundancy disk Q).

In the case of five data columns and four data rows, the number of diagonals is one greater than the number of rows. Hence the diagonal parity column Q comprises one more block than the other columns. More generally, as will be discussed below, the number of data columns is a prime number, and the number of rows is one less than that prime number, creating the asymmetry discussed hereinabove.

In practice the various columns are distributed over the physical disks available, so as not to cause system bottlenecks.

In an alternative to the above and as discussed below in respect of FIGS. 11 and 12, an array is set up again with a prime number of columns and one less than that prime number of rows, and one or more diagonals across the data disks are left blank. Hence, in the example where one diagonal is left blank, the row and diagonal parity disks, p and q, as well as one of the data disks have one more block than the other data disks.

In another alternative to the above and as discussed below in respect of FIGS. 19 and 20, an array is set up again in which more than one row parity column is present. This configuration may result in higher capacity overhead which allows for faster rebuild of a single disk failure.

The array may comprise a plurality of solid state drives (SSD) as opposed to magnetic disks. SSDs are random access, whereas magnetic disks are mechanical devices with momentum. The magnetic disks are thus most efficient where data readout is largely serial and having uneven sizes of columns between stripes causes the magnetic disks to work inefficiently. SSDs however are solid state with no momentum issues and thus the present embodiments are ideally suited to an array of SSD devices, or any other random access device.

As mentioned above, the number of data columns may equal a prime number and the number of data rows is one less than the number of data columns, to create an asymmetry that ensures that each column is absent from one of the diagonals.

In an embodiment, the number of data columns is equal to a number of disks allowed in the array—which is the prime number referred to above. At any given time an actual number of disks present is less than or equal to the allowed number of disks, so that new disks can be added until that allowed number is reached. When a disk is added, data parity blocks need to be added to the new disk to keep the parity blocks, the p and q columns, evenly spread over the physical disks to avoid system bottlenecks. Hence the controller 12 comprises a disk addition unit 24 to manage the process of adding a disk to the array. In order to add a new disk to the array and maintain a balance of parity blocks over the array, the disk addition unit 24 migrates a row parity block to the new disk. However, in an embodiment, instead of actually writing data on the new disk, the unit in fact retains the row parity blocks at their original disk position and defines a zeroed block of data in the new disk to receive future parity updates for the selected row parity block. Because the original parity block is retained, zero is the current correct parity for the row, so that only updates from now onwards are needed and a resource consuming read and write is avoided. The disk addition unit copies a single diagonal parity block to the new disk since the addition of a new disk means there is a single old diagonal parity block that does not reside in the new diagonal parity group. The rest of the diagonal parity blocks are defined as zeroed blocks of data in an identical manner to the case described above for row parity blocks, because they can be placed in positions such that they are in the same parity groups as the old diagonal parity blocks.

The controller 12 comprises a single-disk-failure recovery unit 20. A basic embodiment recovers the data of the entire disk using row parity only or diagonal parity only. However a more efficient embodiment uses row parity to recover just some, typically half, of the lost data blocks and then switches to diagonal parity to recover the remaining data blocks. The switch to diagonal parity means that data blocks already read to recover row parity data can be reused and thus the entire disk can be recovered with considerably fewer read operations.

A double-disk-failure recovery unit 22 is used to recover data following failure of two of the disks and is discussed in greater detail below in respect of FIG. 18. Briefly the unit selects a first block for recovery from one of the disks, where the block's diagonal parity includes that block but does not include any blocks from the other missing column. The unit recovers this first block using the diagonal parity. The unit then recovers the block of the same row in the second missing disk using the row parity. The unit continues to alternate between diagonal and row parity until all the rows are recovered.

The data update unit 18 writes a new data block over an old data block. The process is described in greater detail in respect of FIG. 8 herein. The data update unit reads the old data block, and existing parity data, then writes the new data block and XORs data of the old data block with data of the new data block and the existing parity data to form new parity data. There is no need to read the other data blocks in the same row or column since they remain unchanged, meaning their parity remains unchanged.

Now considered in greater detail, the present embodiments reduce system overheads at the expense of capacity. A block is added to contain the parity of the $k^{th}$ diagonal. This leads to the disadvantage of having columns which are different sizes, and thus disks which are different sizes. In fact the different sized disk problem can be avoided if the blocks are spread over different disks in such a way as to provide no noticeable difference. Spreading over different disks has the added advantage of preventing bottleneck creation, as discussed with the existing schemes.

As discussed above, a RAID-6 scheme based on magnetic disks requires sequential disk actions and the absence of an even disk layout means that the tendency of disk actions to be sequential is lost. However when working with SSDs (Solid State Drives) which are much more random access, data access can be in any desired sequence without any issue of mechanical inertia.

An SSD is a data storage device that uses solid-state memory to store persistent data with the intention of providing access in the same manner of a traditional block i/o hard disk drive. SSDs are distinguished from traditional hard disk drives (HDDs), which are electromechanical devices containing spinning disks and movable read/write heads. In contrast, SSDs use microchips which retain data in non-volatile memory chips and contain no moving parts. Compared to electromechanical HDDs, SSDs are typically less susceptible to physical shock, are silent, have lower access time and latency, but are many times more expensive per gigabyte (GB). SSDs use the same interface as hard disk drives, thus easily replacing them in most applications.

At present, SSDs use NAND-based flash memory, which retains memory even without power. SSDs using volatile random-access memory (RAM) also exist for situations which require even faster access, but do not necessarily need data persistence after power loss, or use external power or batteries to maintain the data after power is removed The scheme presently being outlined also requires more space for redundancy than the previously outlined RAID-6 schemes. However as K gets larger, the additional overhead gets smaller so that this particular disadvantage is manageable. In particular K must be at least as large as the number of disks, but it can be larger as well, and even considerably larger, in order to reduce the overhead.

Decoding in the event of failure is relatively simple. For a two-disk failure, as shown in FIG. 18, a procedure zigzags between rows and diagonals, as will be explained in greater detail herein. For a single disk failure, FIGS. 16 and 17, the number of reads can be reduced by using diagonal parity based on rows that have already been read wherever possible, something that the Even Odd and RDP systems does not allow without increasing IO overhead for update operations.

An alternative embodiment, discussed below with respect to FIGS. 11 and 12, uses an empty diagonal in place of an extra block on the Q disk. In practice there is no memory that must be left empty, rather the empty space can be a geometric construct used to map the data onto actual disks, with different sizes of disks or columns. As with the first embodiment this cannot be done onto magnetic disks without seriously affecting the performance. Other alternative embodiments may use any number of such empty diagonals.

Another alternative embodiment, discussed below with respect to FIGS. 19 and 20, uses multiple row parity columns to reduce the rebuild time of a single disk failure at the expense of additional capacity overhead.

A common point between the embodiments is the use of different size columns for the storage scheme. Additionally, the number of parity blocks in these embodiments is equal to the number of parity sets, such that each data block is present in exactly two parity blocks.

SSD, as discussed, is a random access media storage and is suitable for distributed mapping of data. That is to say there is no constraint caused by mechanical momentum that data should be consecutive. Disks with distributed mapping can have either static mapping or dynamic mapping and the mapping may include a table of metadata to say where the extra Q blocks reside. Whatever the mapping, access has to be random, since the extra Q blocks are distributed independently of the location of the data for which they are the parity.

Now the P and Q may be spread over different disks, allowing the system to take away or add disks. Disks are generally taken away following failure and the prior art systems may be unprotected until the missing disk is replaced. The present system allows for disks to be added freely up to a predetermined number, the original K. That is to say the original K represents a number of total disks in the system, which can be any combination of real and virtual disks, giving a system which is readily expandable up to K disks. The system needs to be balanced, and the P and Q data are spread over the various real disks, so that whenever a new real disk is provided, parts of P and Q may be moved to the new disks so that the system remains balanced.

Moving data is an expensive system operation. In an embodiment the actual data that is moved upon disk addition is lowered to virtually zero. The new disk begins with data zero, which is in fact the correct parity for a new bit added to a row that is already parity checked. Hence there is no need to transfer actual data, merely to update the parity whenever something on the row now changes. The same applies with the diagonals provided the parities of the diagonals are written in the right places. Only the extra diagonal parity needs to be added and actually written—since in this case alone the parity is not necessarily zero.

A variation of the scheme could have left and right diagonals as a parity scheme instead of rows and diagonals, or any other two independent parity groups, where the parity blocks are stored in two of the columns. Each data block may be present in two of the parity blocks, in a manner such that the number of parity sets matches the number of parity blocks.

The present embodiments are now considered in greater detail. Embodiments may be simple to understand and implement, as well as efficient and flexible with respect to the parameters outlined in previous sections. Embodiments may be optimal in terms of updating data, mainly because this is the most frequent operation. Additionally, the present embodiments include the possibility of reducing reads when recovering from a single disk failure.

Relating now to FIG. 5, which is a simplified schematic diagram, in the case shown, k is 5, a prime number, and there are five columns, $D_0$-$D_4$. There are four rows (k−1). The P column consists of the same four rows but the Q column has an extra row.

The block size may be defined as 4k. The same scheme is shown in FIG. 6, in which the individual data blocks are identified.

The variable depth RAID scheme is in many respects simpler than the schemes presented in the previous section. Instead of finding a sophisticated way of dealing with the extra diagonal, it is simply added as an additional block, a specific parity block. It should be noted that each cell in the scheme can be mapped to a native page read and written in a single operation. Each stripe contains k (k must be prime) data columns, and two parity columns P and Q. The stripe is composed of a quasi-matrix of blocks, which contains k−1 rows. Column P contains k−1 blocks, each consisting of the parity of the k data disk blocks in its row. The k by k−1 matrix made up of the blocks in the data columns contains k diagonals, each of size k−1. Column Q, in contrast with the rest of the columns, contains k blocks and not k−1. Each of the k blocks in disk Q holds the parity of one of the diagonals.

It should be noted that the ordering of blocks within each column may be arbitrary. Furthermore, the extra block in column Q may be placed in a data column which does not contain a data block in the diagonal of which this block is the parity. Some of the rows may be blank.

The resulting code is optimal under nearly all operations with respect to IOs and computation, excluding the reads needed to rebuild a disk after one failure. The rebuild overhead after one disk failure can be brought down to a bit more than 3k/4 reads, midway between the optimal of k/2 and the k reads needed by Even/Odd and RDP. The extra block causes the capacity overhead to grow slightly, but this overhead of $1/(k^2-k)$ can be made as small as required by increasing k. Another problem this extra block may pose is that Q is larger than the rest of the columns. This is easily fixed by using a configuration where the parity columns of each stripe are balanced across the various disks. This configuration balances both IOs and capacity utilization between the physical disks.

In cases where it is more favorable to map entire columns to native disk pages, increasing k may bring the extra Q block down to an arbitrarily small size.

Figure 7:
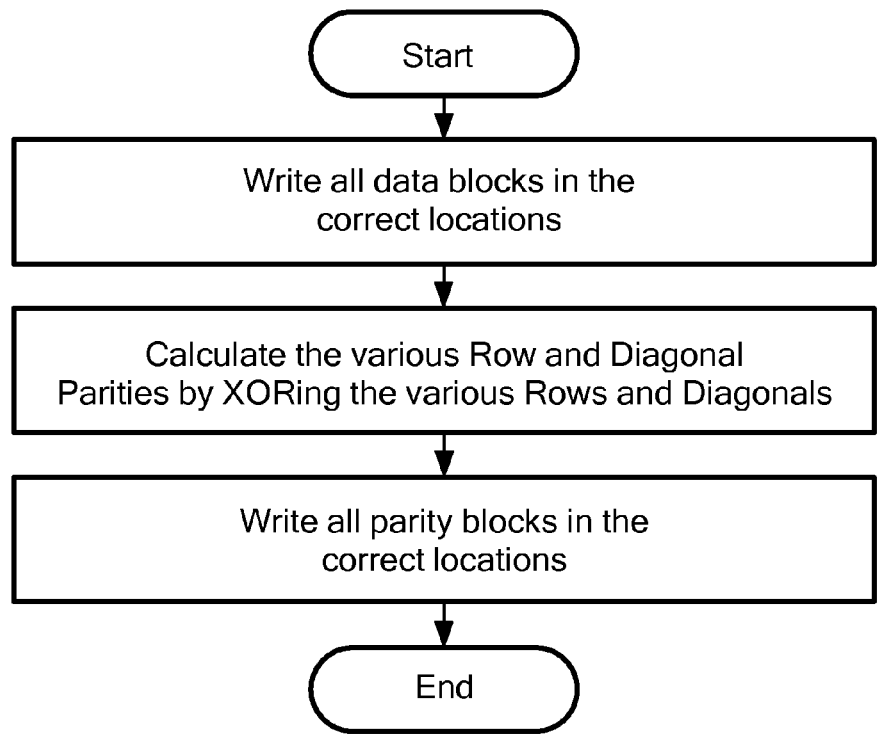
FIG. 7 is a simplified schematic flow chart illustrating a data write operation.

FIG. 7 is a simplified flow chart illustrating a procedure for initial encoding of data onto a disk. All data blocks are written in their desired positions. The row and diagonal parities are then calculated by XOR operations over the various rows and diagonals and written in their appropriate positions.

Figure 8:
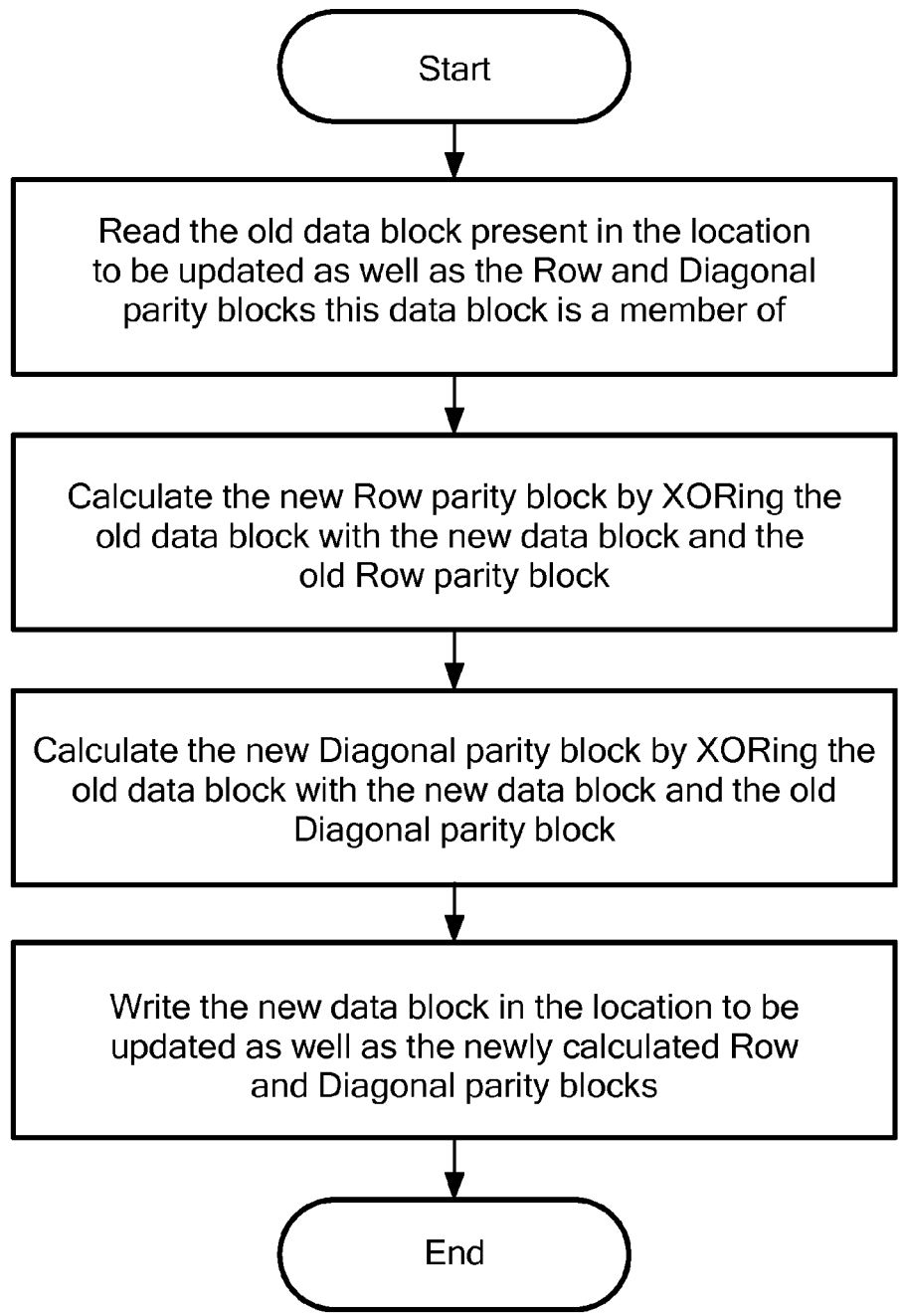
FIG. 8 is a simplified schematic flow chart illustrating a data update operation.

Reference is now made to FIG. 8, which is a simplified diagram illustrating the update procedure when data is modified. Updating is carried out with an optimal number of operations. All that is needed is to write the data itself and to add a one, or a zero as appropriate, to each of the parities. The whole involves three reads, three writes and three XORs. FIG. 8 shows an example in which an entire stripe is rewritten, in which case the new parities are calculated for each row and diagonal by XORing the old data with each one of the two (row and diagonal) old parities and the new data.

Figure 9:
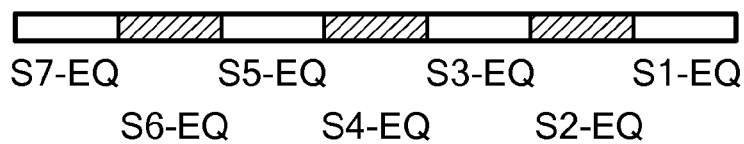
FIG. 9 is a simplified schematic diagram illustrating one way in which the p and q parity blocks can be distributed in balanced manner between actual physical disks.

Reference is now made to FIG. 9, which illustrates a distribution of the P and Q data amongst the actual disks of a system. The disks comprise several stripes with distributed P and Q columns and illustrate how the same sized disks can be used, with different sizes for the Q and other stripes. As illustrated, extra-Q (EQ) blocks are provided at the bottom of each disk, thus providing even distribution between the disks and allowing the addition and removal of disks.

FIG. 10 illustrates an alternative configuration in which Q blocks are mapped onto existing disks. Again the P and Q columns are distributed over disks that are the same size.

Reference is now made to FIG. 11, which is a simplified diagram illustrating a second example. Again K is set at 5, and there are 5 columns $D_0$-$D_4$. There are four rows in the five disks and four rows in the parity disk. However the Q disk also has four rows, since one of the diagonals is left blank.

As illustrated in FIGS. 11 and 12, an equivalent way of providing the effect is by setting one of the diagonals as a virtual diagonal, whose content is fixed and equals zero. In fact any number of diagonals may be set as virtual. It is merely a matter of efficient mapping between cells in the stripe and physical disk locations to eliminate any further capacity overhead. The only constraint when performing such mappings is that cells in the same column must reside on the same disk, and vice versa.

FIGS. 13, 14 and 15 illustrate various distributions of the P and Q data amongst the actual disks of a system, in accordance with this second embodiment. The disks comprise several stripes with distributed D1, P and Q columns which are larger than the rest of the D columns and illustrate how the same sized disks can be used.

As illustrated in FIG. 13, extra-D1, extra-P and extra-Q blocks are provided at the bottom of each disk, thus providing an even distribution between the disks and allowing the addition and removal of disks.

FIG. 14 illustrates an alternative configuration in which the extra blocks are mapped onto existing disks. Again the D1, P and Q columns are distributed over disks that are the same size.

FIG. 15 illustrates an alternative configuration in which the first six stripes are mapped according to their first row, leaving cracks between them where smaller D columns are present. The seventh stripe, or any other data, can be mapped into these cracks. The resulting configuration contains equal sized disks without wasting any additional disk space.

Referring to FIG. 19, again K is set at 5, and there are 5 columns $D_0$-$D_4$. There are two row parity columns P0 and P1, in addition to a single diagonal parity column Q.

As illustrated in FIGS. 19 and 20, P0 may hold parity data for the rows made up of data blocks in columns D1 and D2, while P1 holds parity data for the rows made up of data blocks in columns D3, D4 and D5. In fact any number of row parity columns may be added. Adding such row parity columns reduces the overhead of a single disk rebuild, which can be performed using row parity information, at the expense of increased capacity overhead.

Reference is now made to FIG. 16, which illustrates failure of a single disk, in this case $D_0$. Rebuilding a failed disk after a single disk failure can be done naively using row parity information only. This requires reading k blocks per failed block.

A more efficient method is possible, by utilizing diagonal parity information only, which requires reading k−1 blocks per failed block.

Figure 17:
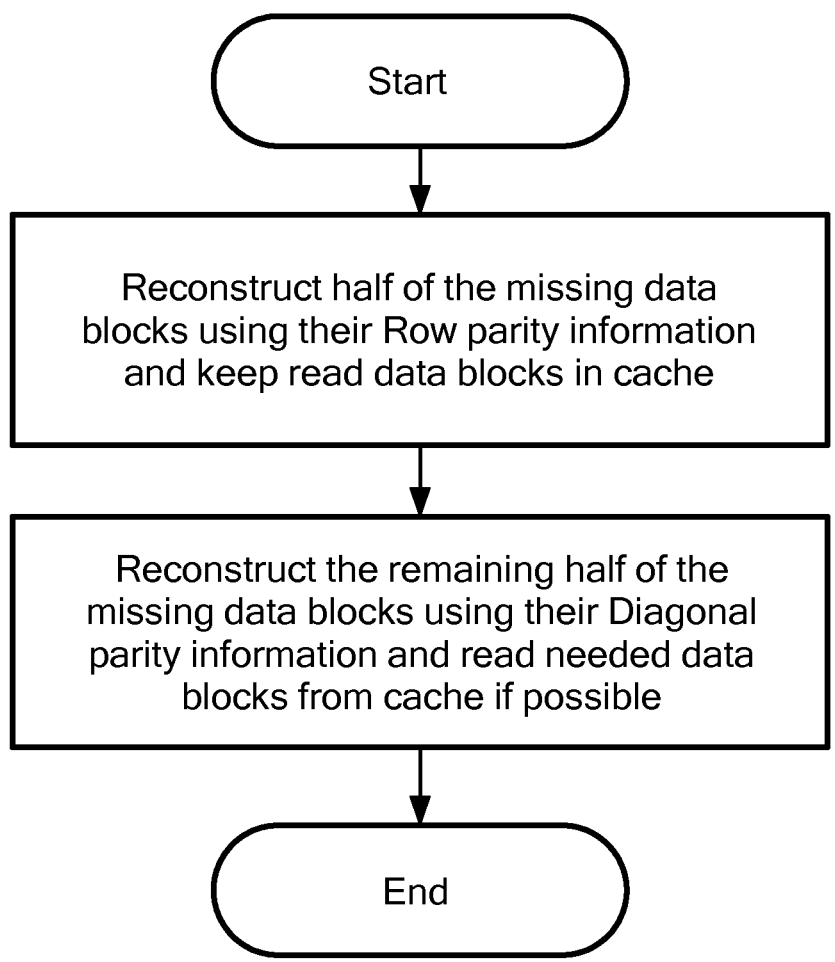
FIG. 17 is a simplified flow chart illustrating the process of recovering data following a single disk failure.

An even more efficient method is illustrated in the flow chart of FIG. 17, which is a simplified flow chart of the recovery process following single disk failure. The method includes using both row and diagonal parity. Assuming $D_0$ fails, we can recover the first two blocks, 1 and 2, using their row parity. It is then possible to recover blocks 3 and 4 using their diagonal parity, but in each case the upper two blocks of the diagonal have already been read when recovering the first two blocks from the row parity and do not need to be read again. Four of the read blocks are in fact utilized both in row and diagonal computations, and thus we reduce the number of actual reads needed.

The above method does not provide any advantage when rebuilding lost parity columns, and thus it requires a little more than 3k/4 reads on average, bearing in mind that each disk contains both data and parity columns in a distribution which balances the reads evenly across the surviving disks.

Figure 18:
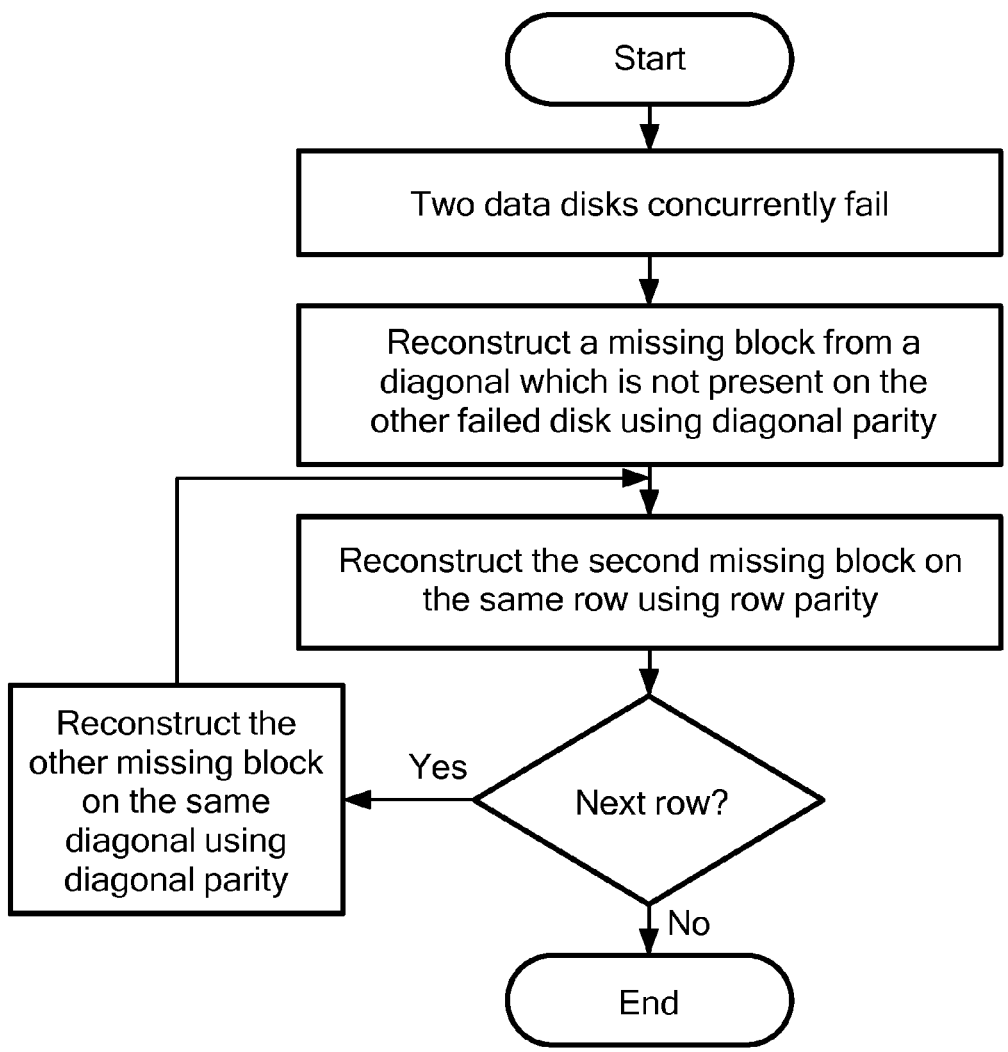
FIG. 18 is a simplified flow chart illustrating the process of recovering data following a double disk failure.

Reference is now made to FIG. 18, which is a simplified flow chart illustrating a procedure for recovery following double disk failure. To rebuild two failed disks, we simply start from a diagonal which has a single representative on one of the failed columns, and reconstruct the first missing block. We then utilize that block to reconstruct the block residing on the same row in the second failed disk, and continue iteratively. Rebuilding parity columns can be done by using the encoding procedure.

Figure 21:
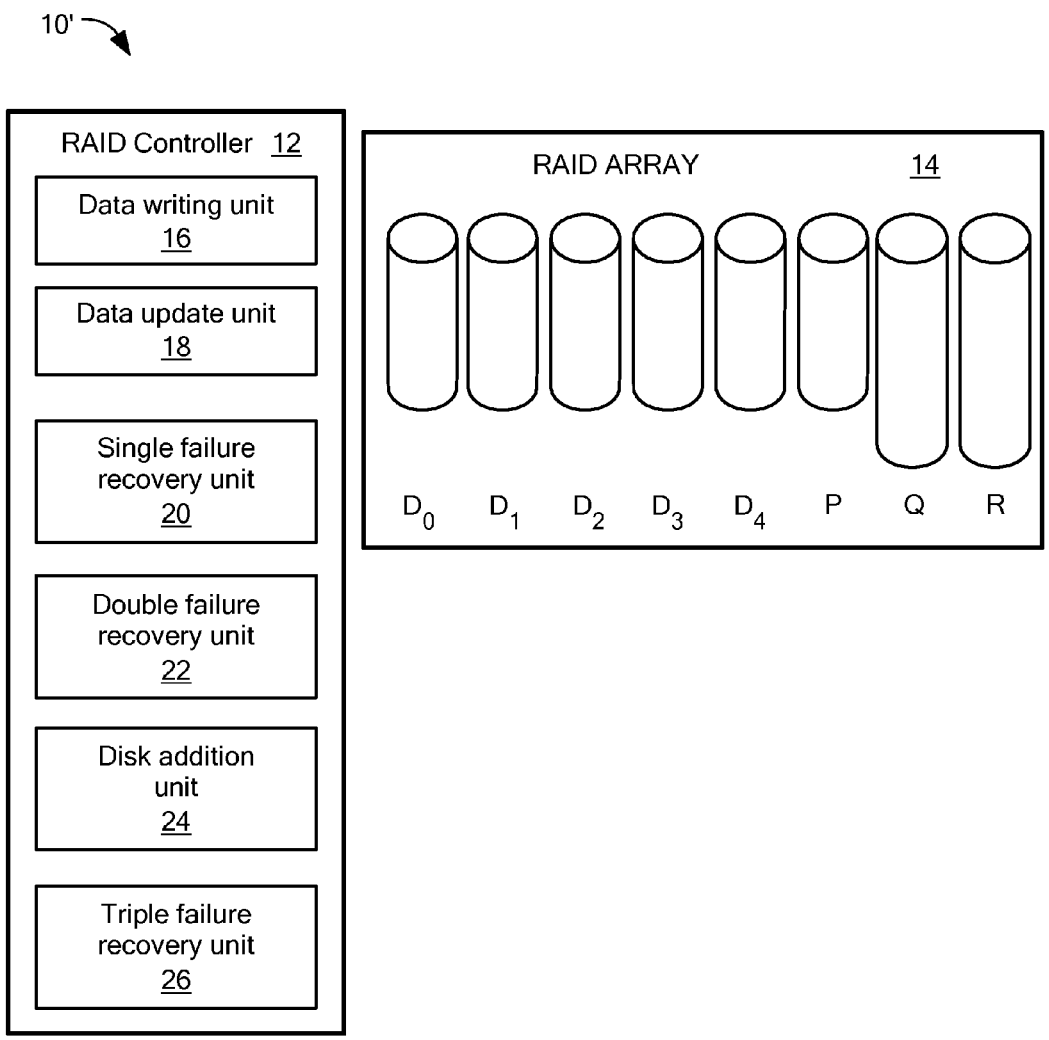
FIG. 21 is a simplified schematic diagram illustrating an example of a RAID memory array configured to recover from triple disk failure.

Referring to FIG. 21, a memory storage system 10' is used to recover data after a triple disk failure. The memory storage system 10' includes the same components as the memory storage system 10 and further includes an additional diagonal parity column R (redundancy storage disk R) and a triple failure recovery unit 26 to recover data following concurrent failure of three storage disks. The diagonals for determining parity in the redundancy R are opposite to the diagonals for determining parity for the diagonal parity column Q (redundancy storage disk Q) as described with respect to FIG. 23. The diagonal parity column R, like diagonal parity column Q, includes one more block than the other data columns.

FIG. 22 is similar to FIG. 5 but includes the additional R column. That is, in this example, k is 5, a prime number, and there are five data columns (data storage disks), $D_0$-$D_4$. There are four rows (k−1). The P redundancy column consists of the same four rows but the Q column and the R column each have an extra row.

Figure 23:
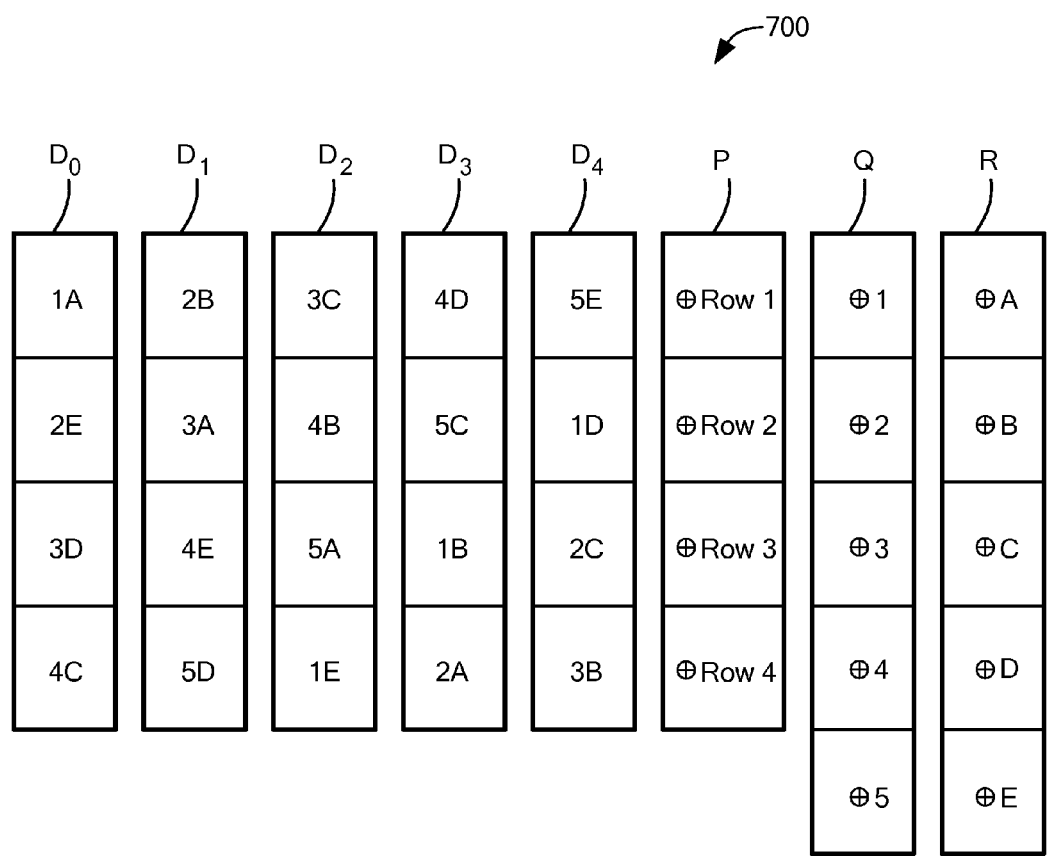
FIG. 23 is a schematic block diagram showing in greater detail an example of the distribution of data blocks of FIG. 22.

FIG. 23 has the same scheme as shown in FIG. 22, but the individual data blocks are identified. The P column (redundancy storage disk) measures parity by data block rows in the data disks $D_0$-$D_4$. For example, the first parity block of P measures the parity of first row of the data columns (i.e., the first block performs XOR function on data blocks 1A of $D_0$, 2B of $D_1$, 3C of $D_2$, 4D of $D_3$ and 5E of $D_4$), the second parity block measures the parity of second row of the data columns (i.e., the second parity block performs XOR function on data blocks 2E of $D_0$, 3A of $D_1$, 4B of $D_2$, 5C of $D_3$ and 1D of $D_4$), the third parity block measures the parity of third row of the data columns (i.e., the third parity block performs XOR function on data blocks 3D of $D_0$, 4E of $D_1$, 5A of $D_2$, 1B of $D_3$ and 2C of $D_4$) and the fourth parity block measures the parity of fourth row of the data columns (i.e., the fourth parity block performs XOR function on data blocks 4C of $D_0$, 5D of $D_1$, 1E of $D_2$, 2A of $D_3$ and 3B of $D_4$).

The Q Column (redundancy storage disk) measures parity by diagonals in the data disks. For simplicity of understanding, the data disks $D_0$-$D_4$ are labeled with an alphanumeric number herein as an example to understand better the parity using diagonals as further described. For example, the first parity block of Q performs XOR function on data blocks labeled with a "1" or data blocks 1A of $D_0$, 1E of $D_2$, 1B of $D_3$ and 1D of $D_4$, the second parity block of Q performs XOR function on parity blocks labeled with a "2" or parity blocks 2E of $D_0$, 2B of $D_1$, 2A of $D_3$ and 2C of $D_4$, the third parity block of Q performs XOR function on data blocks labeled with a "3" or data blocks 3D of $D_0$, 3A of $D_1$, 3C of $D_2$ and 3B of $D_4$ and the fourth parity block of Q performs XOR function on data blocks labeled with a "4" or data blocks 4C of $D_0$, 4E of $D_1$, 4B of $D_2$ and 4D of $D_3$.

The R Column (redundancy storage disk) measures parity by diagonals in the data disks which are opposite to diagonals used in Q Column (disk). For example, the first parity block of R performs XOR function on data blocks labeled with a "A" or data blocks 1A of $D_0$, 3A of $D_2$, 5A of $D_3$ and 2A of $D_4$, the second parity block of R performs XOR function on data blocks labeled with a "B" or data blocks 2B of $D_1$, 4B of $D_3$, 1B of $D_3$, and 3B of $D_4$, the third parity block of R performs XOR function on data blocks labeled with a "C" or data blocks 4C of $D_0$, 3C of $D_2$, 5C of $D_3$ and 2C of $D_4$ and the fourth parity block of R performs XOR function on data blocks labeled with a "D" or data blocks 3D of $D_0$, 5D of $D_1$, 4D of $D_3$ and 1D of $D_4$.

Figure 24:
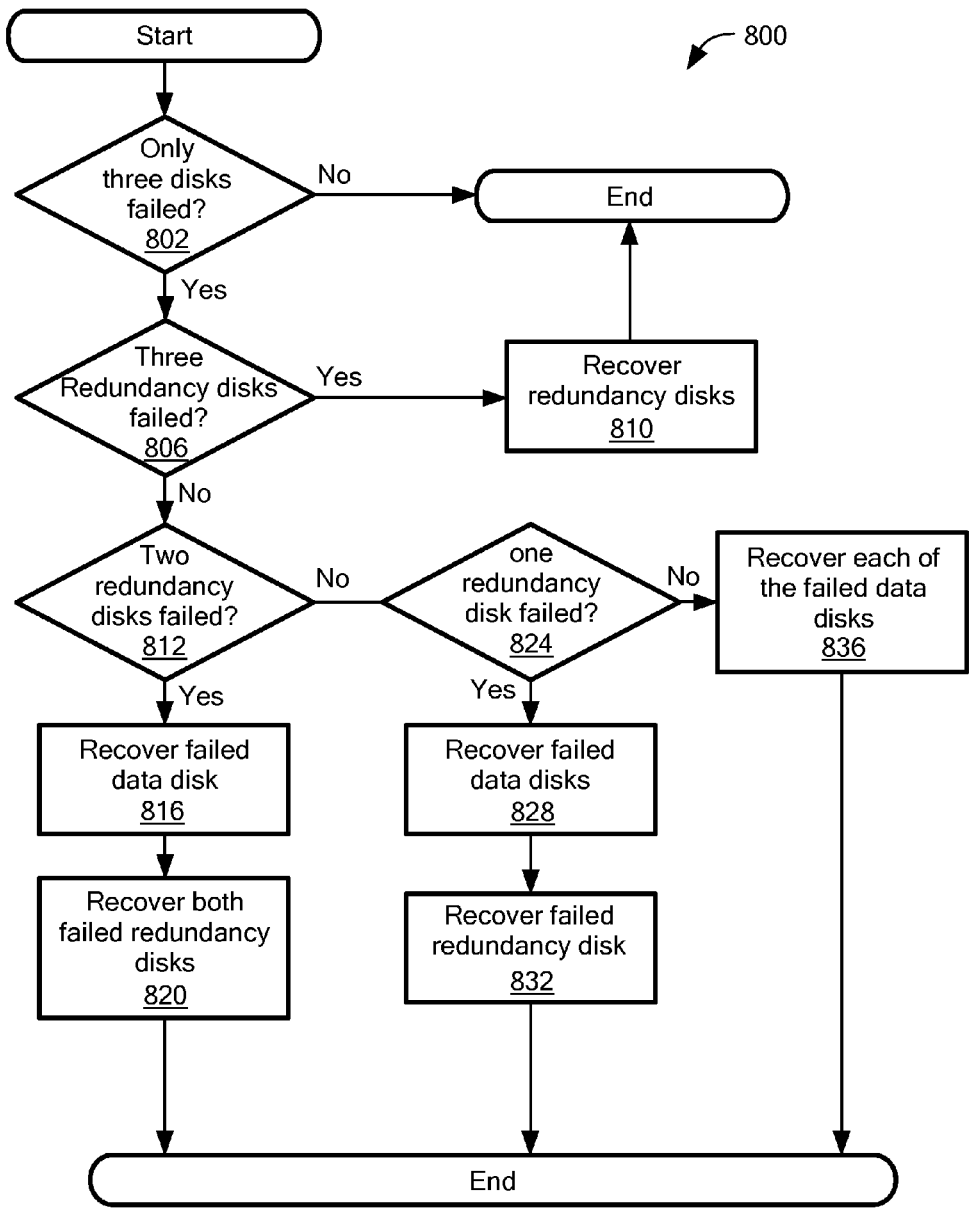
FIG. 24 is a flowchart of an example of a process to recover data after a triple disk failure.

Referring to FIG. 24, an example of a process to recover data when three disks have failed is a process 800. Process 800 determines if only three disks have failed (802) and if only three disks have failed, process 800 determines if all three failed disks that failed are redundancy disks (806).

If all three disks that failed are the redundancy disks, process 800 recovers the redundancy disks (810). For example, if the P, Q, and R redundancy disks failed, then each of the redundancy disks are regenerated as described with respect to FIG. 23 using the data disks $D_0$-$D_4$.

If the three disks that failed are not all redundancy disks, process 800 determines if two of the disks that failed are redundancy disks (812). If two of the disks that failed are redundancy disks, process 800 recovers the failed data disk (816) first and then recovers both of the redundancy disks (820) next. For example, the one redundancy disk that has not failed is used to recover the failed data disk. Once all the data disks are available the failed redundancy disks may recovered as described with respect to FIG. 23 using the data disks $D_0$-$D_4$.

If two of the disks that failed are not redundancy disks, process 800 determines if one of the disks that failed is a redundancy disk (824). If one of the disks that failed is a redundancy disk, process 800 recovers the data disks (828) first and recovers the redundancy disk (832) next. For example, the two redundancy disks that have not failed are used to recover the two failed data disks. Once all the data disks are available the single failed redundancy disk may recovered as described with respect to FIG. 23 using the data disks $D_0$-$D_4$.

If one of the disks that failed is not a redundancy disk, process 800 recovers each of the failed data disks (836). For example, one of the failed disks may be recovered using the three redundancy disks and then the remaining two data disks may be recovered using RAID-6 as described herein.

Figure 25:
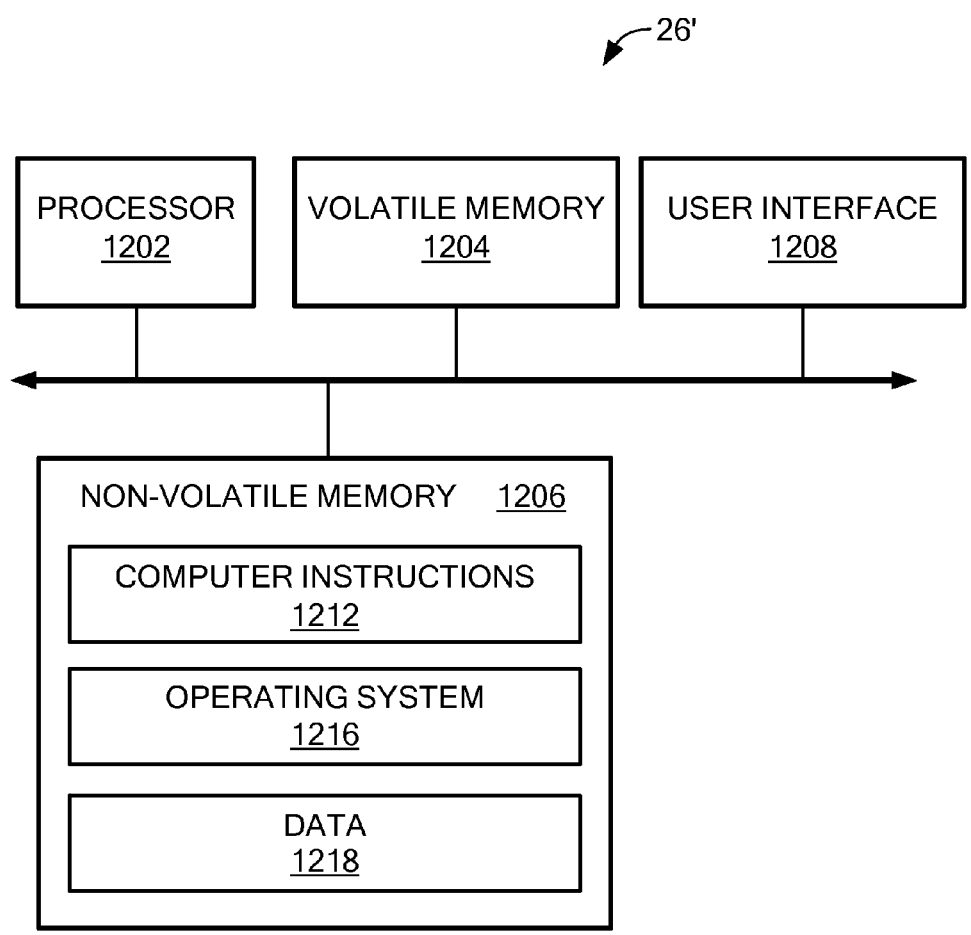
FIG. 25 is a computer on which all or part of the processes of FIG. 24 may be implemented.

Referring to FIG. 25, in one example, a triple failure recovery unit is a triple recovery unit 26'. The triple recovery unit 26' includes a processor 1202, a volatile memory 1204, a non-volatile memory 1206 (e.g., hard disk) and the user interface (UI) 1208 (e.g., a graphical user interface, a mouse, a keyboard, a display, touch screen and so forth). The non-volatile memory 1206 stores computer instructions 1212, an operating system 1216 and data 1218. In one example, the computer instructions 1212 are executed by the processor 1202 out of volatile memory 1204 to perform all or part of the processes described herein (e.g., process 800).

The processes described herein (e.g., process 800) are not limited to use with the hardware and software of FIG. 25; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 800 is not limited to the specific processing order of FIG. 24. Rather, any of the processing blocks of FIG. 24 may be re-ordered, combined or removed, performed in parallel or in serial, as necessary, to achieve the results set forth above.

Figure 26:
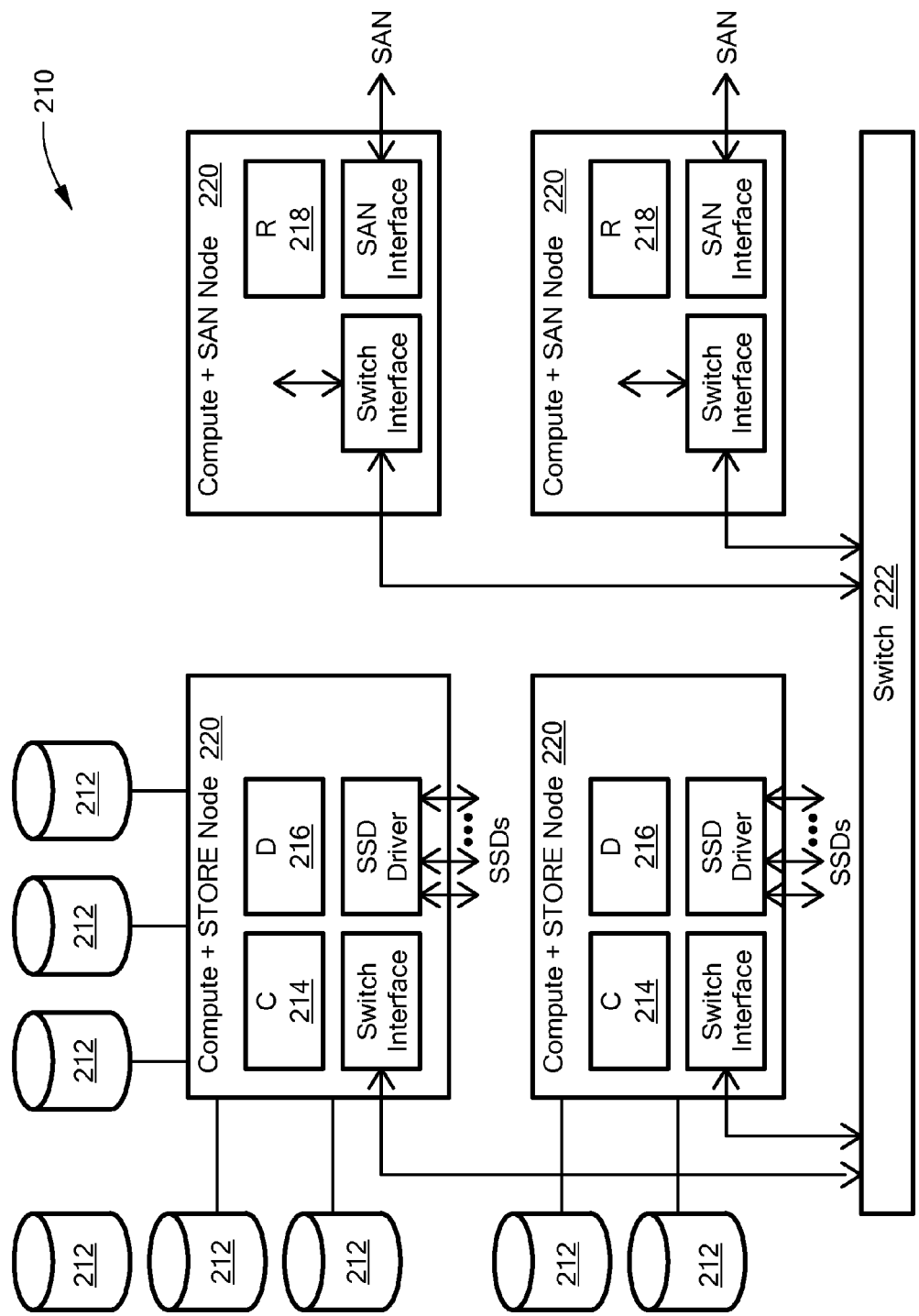
FIG. 26 is a simplified diagram of a system on which any of the features described with respect to FIGS. 21 to 25 may be implemented.

Referring to FIG. 26, in one example, the memory system 10' may be used in a system 210 for scalable block data storage and retrieval using content addressing and described in U.S. patent application Ser. No. 12/845,912, Patent Publication Number 20120124282, entitled "Scalable Block Data Storage Using Content Addressing," which is incorporated herein in its entirety. In one particular example, the memory system 10' is used with the data (D) modules 216.

The system 210 includes data storage devices 212 on which the data blocks are stored. The storage devices 212 are networked to computing modules, there being several kinds of modules, including control (C) modules 214 and data (D) modules 216. The modules carry out content addressing for storage and retrieval, and the network defines separate paths or planes, control paths or a control plane which goes via the control modules 214 and data paths or a data plane which goes via the data modules 216.

The control modules 214 may control execution of read and write commands. The data modules 216 are connected to the storage devices and, under control of a respective control module, pass data to or from the storage devices. Both the C and D modules may retain extracts of the data stored in the storage device, and the extracts may be used for the content addressing.

Routing modules 218 may terminate storage and retrieval operations and distribute command parts of any operations to control modules that are explicitly selected for the operation in such a way as to retain balanced usage within the system 210.

The storage devices may be solid state random access storage devices, as opposed to spinning disk devices; however disk devices may be used instead or in addition.

A deduplication feature may be provided. The routing modules and/or data modules may compare the extracts or hash values of write data with hash values of already stored data, and where a match is found, simply point to the matched data and avoid rewriting.

The modules are combined into nodes 220 on the network, and the nodes are connected over the network by a switch 222.

The use of content addressing with multiple data modules selected on the basis of the content hashing, and a finely-grained mapping of user addresses to Control Modules allow for a scalable distributed architecture.

The processing blocks (for example, in the process 800) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A redundant array of independent disk (RAID) memory storage system comprising:
   a plurality of data storage disks comprising data blocks;
   a first redundancy storage disk comprising parity blocks that are a parity by row of the data blocks in the data storage disks;
   a second redundancy storage disk comprising parity blocks storing parities of diagonals of the data blocks in the data storage disks;

a third redundancy storage disk comprising parity blocks storing parities of diagonals of the data blocks in the data storage disks; and circuitry configured to recover data from three failed storage disks, wherein the number of data blocks used to determine a row parity in a parity block of the first redundancy storage disk is more than the number of data blocks used to determine a diagonal parity in a parity block of the second redundancy storage disk or the third redundancy storage disk.

2. The RAID memory storage system of claim 1, wherein the first, second and third redundancy storage disks perform parity independently from each other.

3. The RAID memory storage system of claim 1, wherein each data block of the data storage disks is used to determine parity in exactly three parity blocks.

4. The RAID memory storage system of claim 1, wherein the second redundancy storage disk comprises one more parity block than data blocks in one of the data storage disks.

5. The RAID memory storage system of claim 4, wherein the third redundancy storage disk comprises one more parity block than data blocks in one of the data storage disks.

6. The RAID memory storage system of claim 1, wherein at least one of the data storage disks and the first, second and third redundancy storage disks is a solid state drive (SSD).

7. The RAID memory storage system of claim 1, wherein a total number of data storage disks equals a prime number.

8. The RAID memory storage system of claim 1, wherein a total number of data blocks in a data storage device is one less than a number of data storage disks.

9. The RAID memory storage system of claim 1, wherein diagonals used to determine parity in the parity blocks in the third redundancy storage disk are opposite diagonals used to determine parity in the parity block of the second redundancy storage disk.

10. The RAID memory storage system of claim 1, wherein the circuitry comprises at least one of a processor, a memory, a programmable logic device or a logic gate.

11. A method comprising:
determining that three storage disks have failed in a redundant array of independent disk (RAID) memory storage system comprising:
a plurality of data storage disks comprising data blocks;
a plurality of redundancy storage disks comprising:
a first redundancy storage disk comprising parity blocks that are a parity by row of the data blocks in the data storage disks;
a second redundancy storage disk comprising parity blocks storing parities of diagonals of the data blocks in the data storage disks; and
a third redundancy storage disk comprising parity blocks storing parities of diagonals of the data blocks in the data storage disks; and
recovering the three storage disks that failed,
wherein the number of data blocks used to determine a row parity in a parity block of the first redundancy storage disk is more than the number of data blocks used to determine a diagonal parity in a parity block of the second redundancy storage disk or the third redundancy storage disk.

12. The method of claim 11, wherein determining that three storage disks have failed comprises determining that three redundancy storage disks have failed, and
wherein recovering the three storage disks that failed comprises recovering the three redundancy storage disks that failed.

13. The method of claim 11, wherein determining that three storage disks have failed comprises determining that two redundancy storage disks and one data storage disk have failed, and
wherein recovering the storage disks that failed comprises recovering the data storage disk that failed and recovering the two redundancy storage disks that failed after recovering the data storage disk that failed.

14. The method of claim 11, wherein determining that three storage disks have failed comprises determining that two data storage disks and one redundancy storage disk have failed, and
wherein recovering the three storage disks that failed comprises recovering the two data storage disks that failed and recovering the redundancy storage disk after recovering the two data storage disks that failed.

15. The method of claim 11, wherein determining that three storage disks have failed comprises determining that three redundancy storage disk have failed, and
wherein recovering the three storage disks that failed comprises recovering one of the three redundancy storage disks that failed and recovering the remaining redundancy storage disks that failed using a RAID-6 method of recovery.

16. An article comprising:
a non-transitory computer-readable medium that stores computer-executable instructions, the instructions causing a machine to:
determine that three storage disks have failed in a redundant array of independent disk (RAID) memory storage system comprising:
a plurality of data storage disks comprising data blocks;
a plurality of redundancy storage disks comprising:
a first redundancy storage disk comprising parity blocks that are a parity by row of the data blocks in the data storage disks;
a second redundancy storage disk comprising parity blocks storing parities of diagonals of the data blocks in the data storage disks; and
a third redundancy storage disk comprising parity blocks storing parities of diagonals of the data blocks in the data storage disks; and
recover the three storage disks that failed,
wherein the number of data blocks used to determine a row parity in a parity block of the first redundancy storage disk is more than the number of data blocks used to determine a diagonal parity in a parity block of the second redundancy storage disk or the third redundancy storage disk.

17. The article of claim 16, wherein the instructions causing the machine to determine that three storage disks have failed comprises instructions causing the machine to determine that three redundancy storage disks have failed, and
wherein the instructions causing the machine to recover the three storage disks that failed comprises instructions causing the machine to recover the three redundancy storage disks that failed.

18. The article of claim 16, wherein the instructions causing the machine to determine that three storage disks have failed comprises instructions causing the machine to determine that two redundancy disks and one data storage disk have failed, and
wherein the instructions causing the machine to recover the three storage disks that failed comprises instructions causing the machine to recover the data storage disk that failed and recover the two redundancy storage disks that failed after recovering the data storage disk that failed.

19. The article of claim 16, wherein the instructions causing the machine to determine that three storage disks have failed comprises instructions causing the machine to determine that two data storage disks and one redundancy storage disk have failed, and
- wherein instructions causing the machine to recover the three storage disks that failed comprises instructions causing the machine to recover the two data storage disks that failed and recover the redundancy storage disk that failed after recovering the two data storage disks that failed.

20. The article of claim 16, wherein the instructions causing the machine to determine that three storage disks have failed comprises instructions causing the machine to determine that three redundancy storage disk have failed, and
- wherein the instructions causing the machine to recover the three storage disks that failed comprises instructions causing the machine to recover one of the three redundancy storage disks that failed and recover the remaining redundancy storage disks that failed using a RAID-6 method of recovery.

* * * * *